US012698733B2

(12) United States Patent
Hao et al.

(10) Patent No.: US 12,698,733 B2
(45) Date of Patent: Aug. 4, 2026

(54) CRANKCASE AIR VALVE STRUCTURE AND AIR COMPRESSOR

(71) Applicant: ZF Commercial Vehicle Systems (Qingdao) Co., Ltd., Qingdao (CN)

(72) Inventors: Xiucheng Hao, Qingdao City (CN); Haiqiang Yuan, Qingdao City (CN)

(73) Assignee: ZF Commercial Vehicle Systems (Qingdao) Co., Ltd., Qingdao (CN)

( * ) Notice: Subject to any disclaimer, the term of this patent is extended or adjusted under 35 U.S.C. 154(b) by 104 days.

(21) Appl. No.: 18/790,054

(22) Filed: Jul. 31, 2024

(65) Prior Publication Data

US 2025/0043705 A1     Feb. 6, 2025

(30) Foreign Application Priority Data

Aug. 1, 2023   (CN) .......................... 202310962112.4

(51) Int. Cl.
  *F01M 13/00*        (2006.01)
  *F16K 15/16*        (2006.01)
(52) U.S. Cl.
  CPC ......... *F01M 13/0011* (2013.01); *F16K 15/16* (2013.01)
(58) Field of Classification Search
  CPC ............. F01M 13/0011; F16K 15/1401; F16K 15/1402; F16K 15/144; F16K 15/16; F16K 15/031
  See application file for complete search history.

(56) References Cited

U.S. PATENT DOCUMENTS

| | | | | | |
|---|---|---|---|---|---|
| 4,976,284 | A | * | 12/1990 | Hovarter | F16K 15/1402 137/856 |
| 6,102,680 | A | * | 8/2000 | Fraser | F04B 39/1073 137/856 |
| 6,767,193 | B2 | * | 7/2004 | Hirose | F16K 15/1402 417/571 |
| 10,208,740 | B2 | * | 2/2019 | Flanigan | F04B 27/1009 |
| 11,111,827 | B2 | * | 9/2021 | Thomas | F16K 15/1848 |

* cited by examiner

*Primary Examiner* — Hailey K. Do
(74) *Attorney, Agent, or Firm* — WARNER NORCROSS + JUDD LLP

(57)           ABSTRACT

A crankcase air valve structure comprises an air intake valve and a valve seat plate which are sequentially mounted on an end surface of a crankcase. The valve seat plate is provided with at least one group of air intake holes. The air intake valve has at least one valve plate, the valve plate having root portions located at two ends thereof and lug portions located between the two ends. The valve plate is connected to a valve body of the air intake valve via the root portions. Sidestep grooves and accommodating recesses are in communication with a gas channel of the crankcase; in a non-air intake state, the valve plate covers a corresponding group of air intake holes; and in an air intake state, the lug portions abut against corresponding accommodating recesses, and the root portions are bent toward corresponding sidestep grooves.

12 Claims, 10 Drawing Sheets

CRANKCASE AIR VALVE STRUCTURE AND AIR COMPRESSOR

CROSS-REFERENCE TO RELATED APPLICATIONS

This application claims priority to and all advantages of Chinese Application No. 202310962112.4 filed on 1 Aug. 2023, the contents of which are incorporated herein by reference.

TECHNICAL FIELD

The present invention relates to the technical field of crankcases, and in particular to a crankcase air valve structure and an air compressor.

BACKGROUND ART

In an existing crankcase air intake structure, an air intake valve plate is generally formed in an elongated shape. The air intake valve plate has one end connected to a valve plate body, and the other end that is a free end. In an air intake process, the air intake valve plate deforms under the action of a gas to allow for passage of the gas, so that the air is taken in.

It is found in a test that the existing crankcase air intake structure has the following problems. In the air intake process, the air intake valve plate deforms, causing a large stress in a connecting end, and causing a breakage in a severe case. Also, in the air intake process, the free end of the air intake valve plate rubs against an end surface of the crankcase, thus causing wear.

Therefore, how to achieve steady air intake control and improve the reliability of the crankcase air intake structure is a problem that is urgent to be solved.

It should be noted that information disclosed in the above background art section is only used to enhance the understanding of the background of the present invention, and therefore may include information that does not constitute the prior art known to those of ordinary skill in the art.

SUMMARY OF THE INVENTION

In view of this, the present invention provides a crankcase air valve structure and an air compressor, which can achieve steady air intake control and improve the reliability of the crankcase air valve structure and the air compressor.

According to an aspect, the present invention provides a crankcase air valve structure, comprising an air intake valve and a valve seat plate that are sequentially mounted on an end surface of a crankcase, wherein the valve seat plate is provided with at least one group of air intake holes; the air intake valve is provided with at least one valve plate, the valve plate having root portions located at two ends thereof and lug portions located between the two ends, and the valve plate being connected to a valve body of the air intake valve by means of the root portions; sidestep grooves and accommodating recesses which are in communication with a gas channel of the crankcase are provided in the end surface of the crankcase; in a non-air intake state, the valve plate covers a corresponding group of air intake holes; and in an air intake state, the lug portions abut against corresponding accommodating recesses, and the root portions are bent toward corresponding sidestep grooves.

In some embodiments, a bottom wall of each of the accommodating recesses is inclined such that a depth of the accommodating recess gradually increases from a middle portion of the accommodating recess to an edge portion of the accommodating recess close to the sidestep groove.

In some embodiments, a depth of the accommodating recess at the edge portion is greater than a thickness of the lug portions.

In some embodiments, a bottom wall of each of the accommodating recesses is inclined such that a depth of each of the sidestep grooves is gradually increases from a middle portion of the sidestep groove to an edge portion of the sidestep groove close to the accommodating recess.

In some embodiments, a slope of the bottom wall of the sidestep groove is determined according to a maximum curvature of the root portion.

In some embodiments, a width of the root portion at an end connected to the valve body is greater than a width of the root portion at an end connected to the valve plate.

In some embodiments, two ends of the valve plate are symmetrical about a center of the valve plate.

In some embodiments, the valve seat plate is provided with a plurality of groups of air intake holes; the air intake valve is provided with a plurality of valve plates, wherein root portions of two adjacent valve plates are connected by means of a connecting bridge, and each connecting bridge fits with an sidestep groove; and in the air intake state, the connecting bridge is bent toward a corresponding sidestep groove.

In some embodiments, the plurality of groups of air intake holes are symmetrical about a center of the gas channel.

In some embodiments, each group of air intake holes comprises a plurality of circular holes, wherein some adjacent circular holes of the circular holes are in communication with each other.

In some embodiments, the valve seat plate is further provided with an exhaust hole, and the air intake valve is further provided with a hollowed-out portion corresponding to the position of the exhaust hole.

According to a further aspect, the present invention provides an air compressor, which is configured with the crankcase air valve structure as described in any one of the foregoing embodiments.

Compared with the prior art, the present invention has at least the following beneficial effects.

According to the crankcase air valve structure of the present invention, the valve plate has a robust structure by virtue of the root portions of the valve plate located at the two ends, the root portions located at the two ends are both stressed in the air intake state to avoid a breakage, the root portions fit with the sidestep grooves, and the sidestep grooves not only make a space for the deformation of the root portions, but also limits the maximum deformation of the root portions, thereby further ensuring the robustness of the root portions. Further, the lug portions of the valve plate fit with the accommodating recesses, and the accommodating recesses accommodate and support the lug portions in the air intake process, so that the lug portions abut against the accommodating recesses to avoid wear.

As such, the crankcase air valve structure of the present invention can achieve steady air intake control and improve the reliability of the crankcase air valve structure and the air compressor.

It should be understood that the above general description and the following detailed description are only exemplary and explanatory, and cannot limit the present invention.

BRIEF DESCRIPTION OF THE DRAWINGS

The accompanying drawings herein, which are incorporated into and constitute a part of the description, illustrate embodiments consistent with the present invention and, together with the description, are used to explain principles of the present invention. Obviously, the accompanying drawings described below show merely some of the embodiments of the present invention, and those of ordinary skill in the art would also have obtained other accompanying drawings according to these accompanying drawings without any creative effort.

DETAILED DESCRIPTION OF EMBODIMENTS

Figure 1:
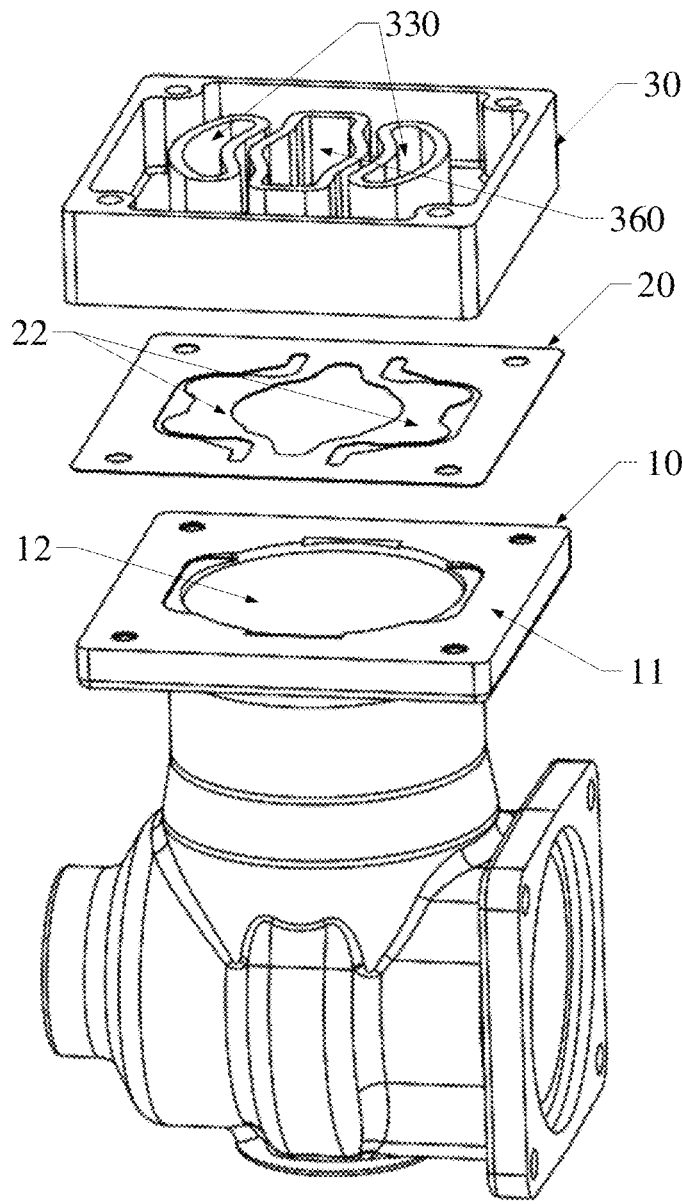
FIG. 1 shows a schematic structural exploded view of a crankcase air valve structure according to an embodiment of the present invention.

Now exemplary implementations will be described more fully with reference to the accompanying drawings. However, the exemplary implementations can be implemented in many forms and should not be construed as being limited to the implementations set forth herein. On the contrary, these implementations are provided to make the present invention thorough and complete, and to fully convey the concept of the exemplary implementations to those skilled in the art.

The accompanying drawings are only schematic illustrations of the present invention, and are not necessarily drawn to scale. In the accompanying drawings, the same reference numerals denote the same or similar parts, and thus the repeated description thereof will be omitted. In the description of the present invention, it should be noted that the orientation or position relationship indicated by the terms such as "top", "bottom", "left" and "right" are based on the orientation or position relationship shown in the accompanying drawings for ease of describing the present invention and simplifying the description only, rather than indicating or implying that the device or element referred to must have a particular orientation or be constructed and operated in a particular orientation, and thus will not to be interpreted as limiting the present invention.

It should be noted that the embodiments of the present invention and features of the various embodiments can be combined with each other without conflict.

Figure 2:
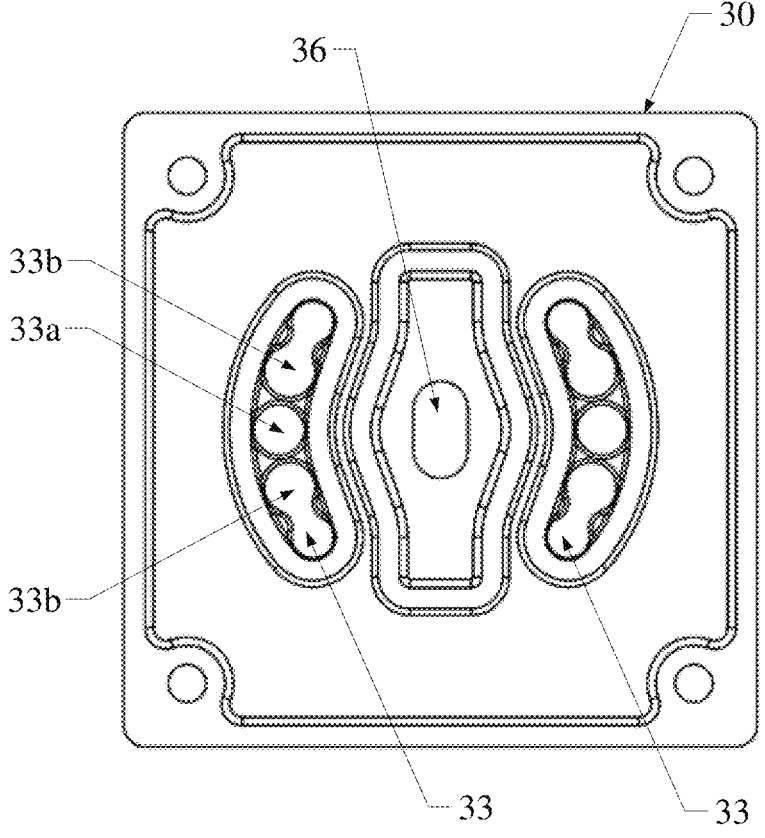
FIG. 2 shows a schematic structural top view of a valve seat plate according to an embodiment of the present invention.
Figure 3:
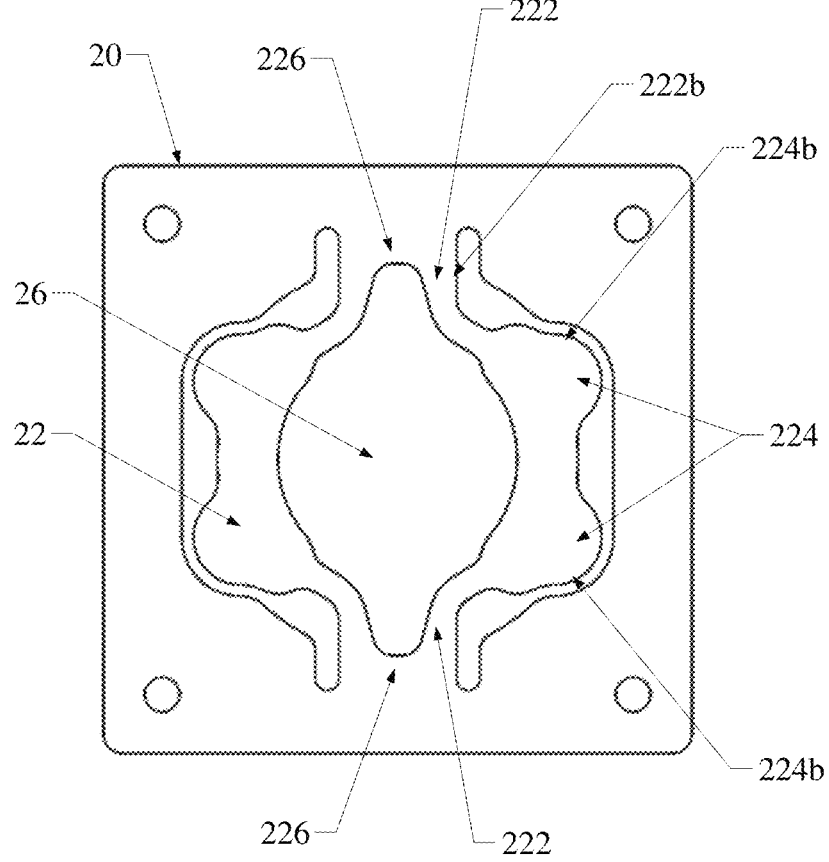
FIG. 3 shows a schematic structural top view of an air intake valve according to an embodiment of the present invention.
Figure 4:
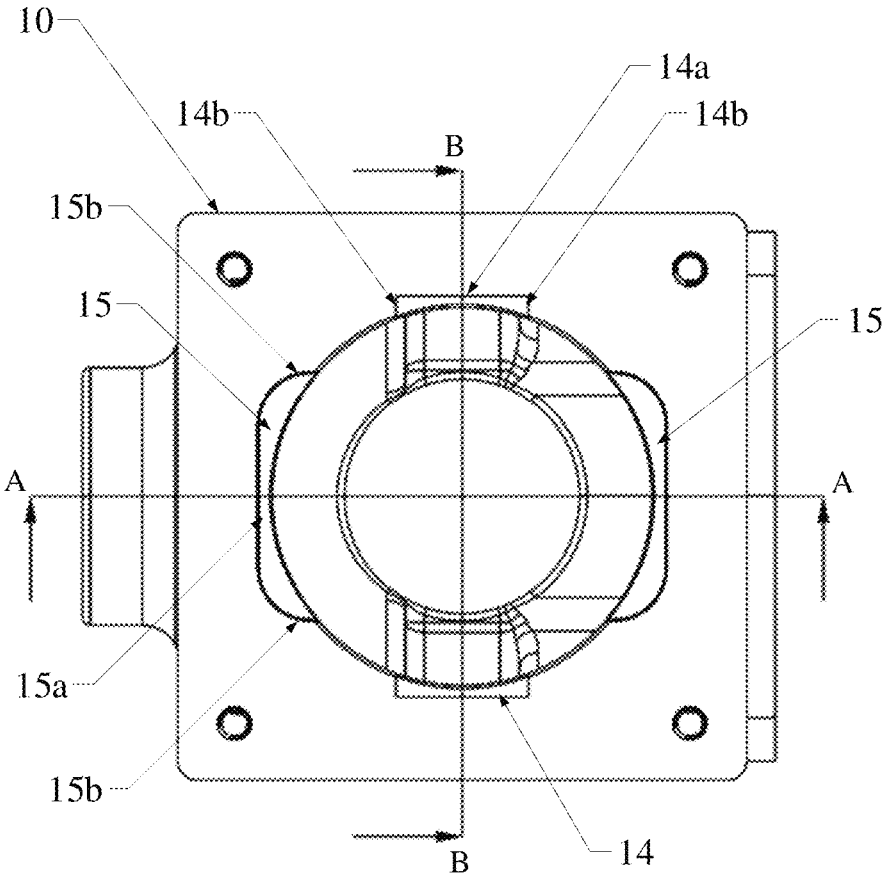
FIG. 4 shows a schematic structural top view of a crankcase according to an embodiment of the present invention.
Figure 5:
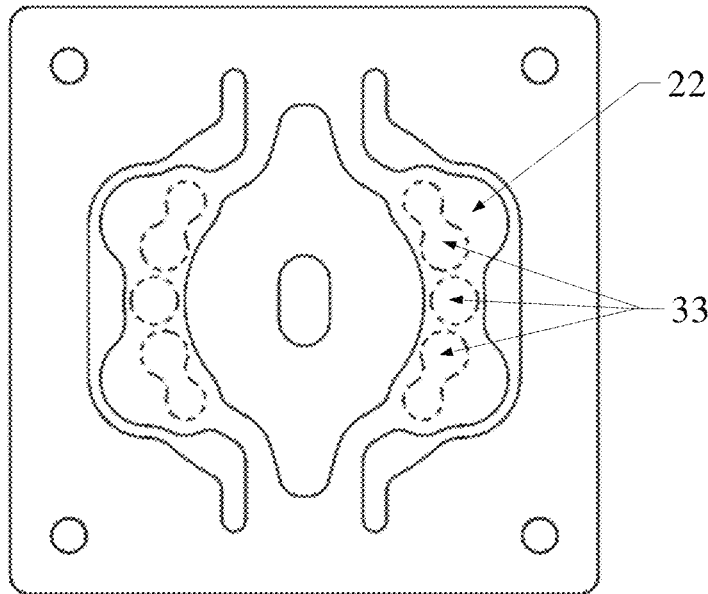
FIG. 5 shows a schematic view of a fitting structure between the air intake valve and the valve seat plate according to an embodiment of the present invention.
Figure 6:
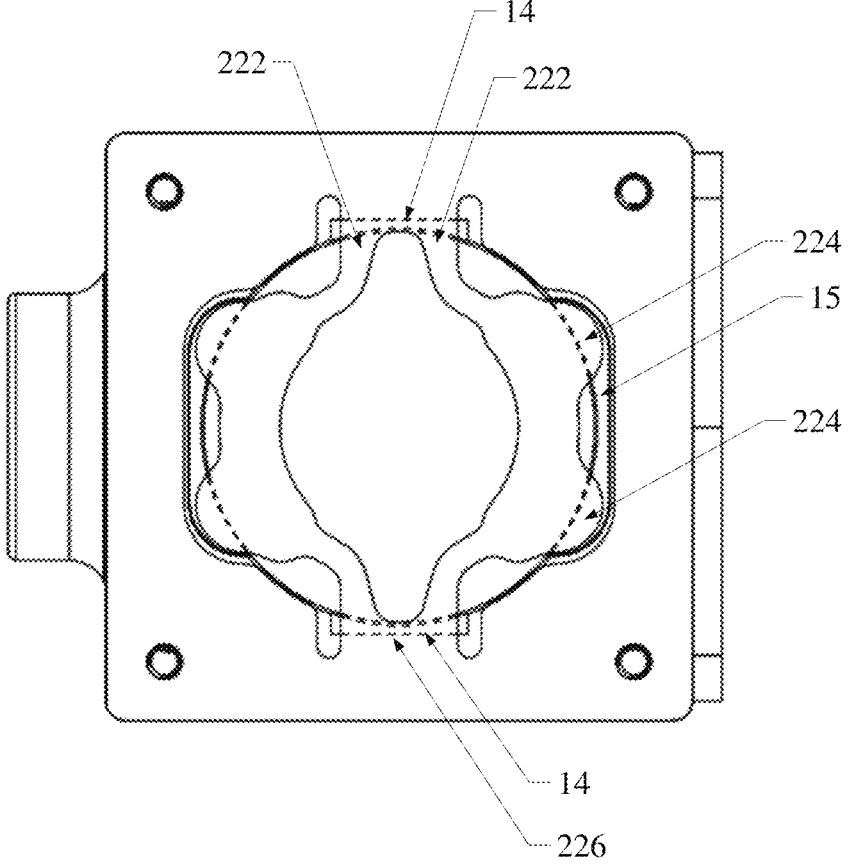
FIG. 6 shows a schematic view of a fitting structure between the air intake valve and the crankcase according to an embodiment of the present invention.

FIG. 1 shows an exploded view of a crankcase air valve structure, FIG. 2 shows a structural top view of a valve seat structure, FIG. 3 shows a structural top view of an air intake valve, FIG. 4 shows a structural top view of a crankcase, FIG. 5 shows a fitting structure between the air intake valve and the valve seat plate, and FIG. 6 shows a fitting structure between the air intake valve and the valve seat plate. With reference to FIGS. 1 to 6, the crankcase air valve structure provided in an embodiment of the present invention comprises an air intake valve 20 and a valve seat plate 30 which are sequentially mounted on an end surface 11 of the crankcase, wherein the valve seat plate 30 is provided with at least one group of air intake holes 33; the air intake valve 20 is provided with at least one valve plate 22, the valve plate 22 having root portions 222 located at two ends thereof and lug portions 224 located between the two ends, and the valve plate 22 being connected to a valve body of the air intake valve 20 by means of the root portions 222; sidestep grooves 14 and accommodating recesses 15 which are in communication with a gas channel 12 of the crankcase 10 are provided in the end surface 11 of the crankcase;

in a non-air intake state, the valve plate 22 covers a corresponding group of air intake holes 33 (see FIG. 5); and in an air intake state, the lug portions 224 abut against corresponding accommodating recesses 15, and the root portions 222 are bent toward corresponding sidestep grooves 14 (see FIG. 6).

In the non-air intake state, the valve plate 22 covers and seals the air intake holes 33. In the air intake state, the valve plate 22 exits the air intake holes 33 under the action of a gas pressure, and is generally bent toward the gas channel 12 of the crankcase 10, such that a gas circulation channel is created between the valve plate 22 and the air intake holes 33. In this case, the root portions 222 is bent the most and undergo a large stress. By means of the design of the root portions 222 located at the two ends of the valve plate 22, the valve plate 22 has a robust structure, and the root portions 222 located at the two ends are both stressed when the valve plate 22 deforms, thus avoiding a breakage. The root portions 222 also fit with the sidestep grooves 14, the sidestep grooves 14 not only make a space for the bending deformation of the root portions 222, but also limit the maximum deformation of the root portions 222, thereby further ensuring the robustness of the root portions 222. Further, the lug portions 224 of the valve plate 22 fit with the accommodating recesses 15, and the accommodating recesses 15 accommodate and support the lug portions 224 in the air intake process, such that the lug portions 224 abut against the accommodating recesses 15 to support the valve plate 22 and avoid the wear of the lug portions 224.

In this way, the crankcase air valve structure of the present invention can achieve steady air intake control and improve the reliability of the crankcase air valve structure.

Figure 7:
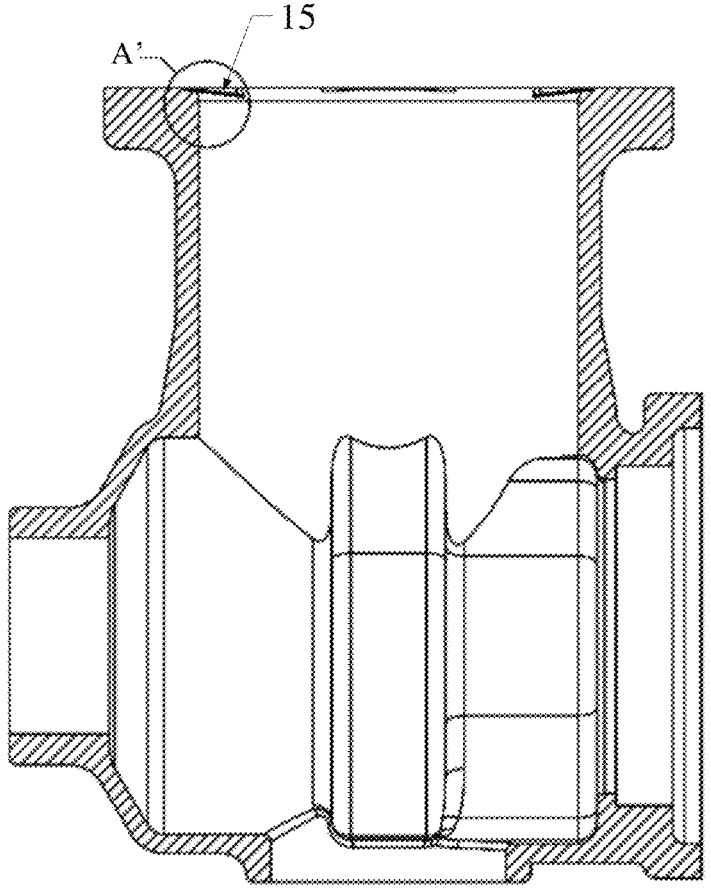
FIG. 7 shows a schematic structural cross-sectional view taken along line A-A in FIG. 4.
Figure 8:
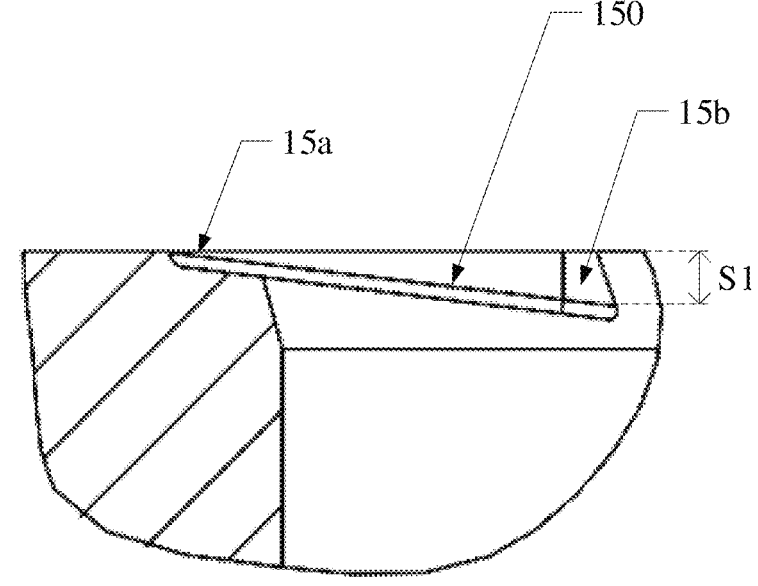
FIG. 8 shows a schematic structural enlarged view of part A' in FIG. 7.

FIG. 7 shows a cross-sectional structure taken along line A-A in FIG. 4, and FIG. 8 shows an enlarged structure of part A' in FIG. 7. As shown in FIGS. 3, 4, 7 and 8, in some embodiments, a bottom wall 150 of the accommodating recess 15 is inclined such that a depth of the accommodating recess 15 gradually increases from a middle portion 15a of the accommodating recess 15 to an edge portion 15b of the accommodating recess 15 close to the sidestep groove 14. In this way, in the air intake state, on the one hand, body parts of the lug portions 224 of the valve plate 22 quickly come into contact with the bottom walls 150 of the accommodating recesses 15 for support, on the other hand, side walls of the edge portions 15b of the accommodating recesses 15 block side walls 224b of the lug portions 224 close to the root portions 222 to prevent the lug portions 224 from slipping off.

In some embodiments, a depth S1 of the accommodating recesses 15 at the edge portion 15b is greater than a thickness of the lug portions 224. In this way, it is ensured that the edge portions 15b of the accommodating recess 15 are deep enough to accommodate and block the side walls 224b of the lug portions 224.

The accommodating recesses 15 may each have a contour slightly greater than the contour of each of the lug portions 224 to adapt to the deformation trend of entire slight extension of the valve plate 22 in the air intake state under the action of the gas pressure, and in combination with the design of the inclined bottom walls 150 of the accommodating recesses 15, in the air intake state, bottom walls of the lug portions 224 abut against the bottom walls 150 of the accommodating recesses 15, and the side walls 224b of the lug portions 224 abut against the side walls of the edge portions 15b of the accommodating recesses 15, so that the entire valve plate 22 remains stable to achieve steady air intake control.

Figure 9:
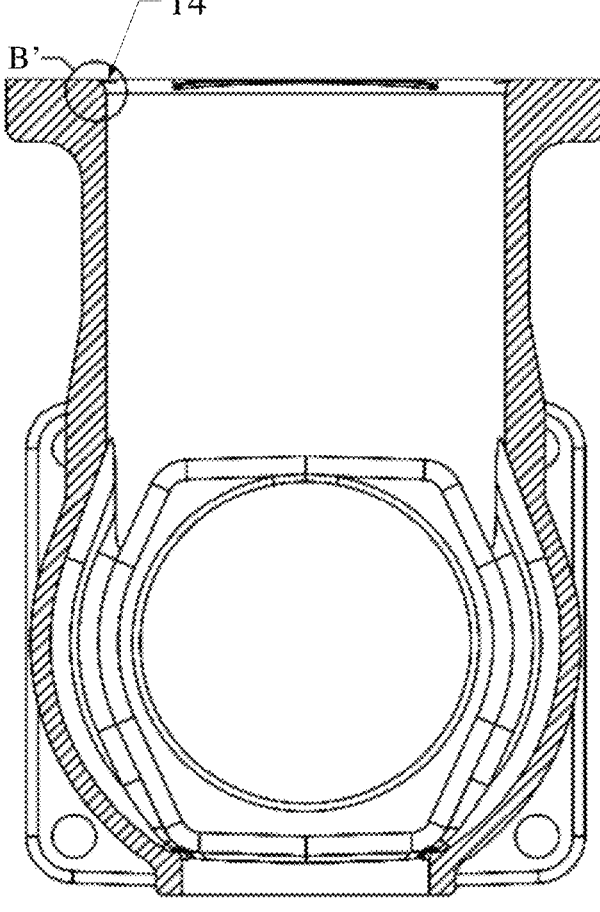
FIG. 9 shows a schematic structural cross-sectional view taken along line A-A in FIG. 4.
Figure 10:
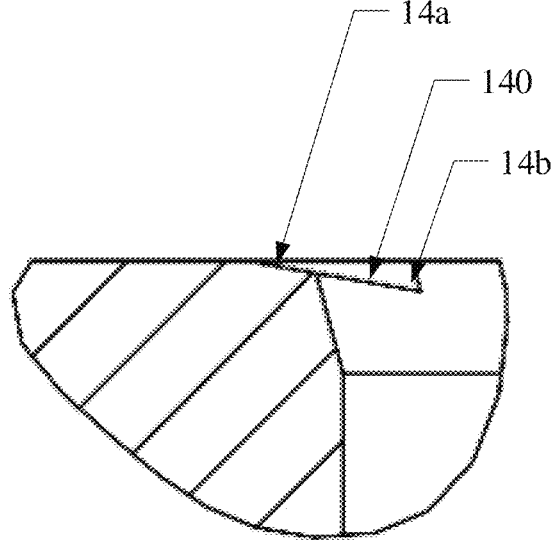
FIG. 10 shows a schematic structural enlarged view of part B' in FIG. 9.

FIG. 9 shows a cross-sectional structure taken along line B-B in FIG. 4, and FIG. 10 shows an enlarged structure of part B' of FIG. 9. As shown in FIGS. 3, 4, 9 and 10, in some embodiments, the bottom wall 140 of the sidestep groove 14 is inclined such that the depth of the sidestep groove 14 is gradually increases from a middle portion 14a of the sidestep groove 14 to an edge portion 14b of the sidestep groove 14 close to the accommodating recess 15. In this way, in the air intake state, on the one hand, the body parts of the root portions 222 of the valve plate 22 quickly come into contact with the bottom walls 150 of the sidestep grooves 14 for support; on the other hand, it can be adapted to the deformation trend of entire slight extension of the valve plate 22 in the air intake state under the action of the gas pressure, and by means of the design of the inclined bottom walls 140 of the sidestep grooves 14, a sufficient space is provided for the bending and extension (that is, with slight twisting) deformation of the root portions 222.

In some embodiments, a slope of the bottom wall 140 of the sidestep groove 14 is determined according to the maximum curvature of the root portion 222. Therefore, by means of the sidestep grooves 14, the maximum deformation of the root portions 222 can be limited, and the root portions 222 can be prevented from breaking, thus ensuring the robustness of the root portions 222.

The sidestep grooves 14 may each have a contour slightly greater than the contour of each of the lug portions 222 to adapt to the deformation trend of entire slight extension of the valve plate 22 in the air intake state under the action of the gas pressure, and in combination with the design of the inclined bottom walls 140 of the sidestep grooves 14, in the air intake state, the bottom walls of the root portions 222 can abut against the bottom walls 140 of the sidestep grooves 14, and the side walls 222b of the root portions 222 close to the lug portions 224 can abut against the side walls of the edge portions 14b of the sidestep grooves 14 to prevent excessive deformation of the root portions 222, thus ensuring the robustness of the root portions 222.

With continued reference to FIGS. 1-6, in some embodiments, a width of the root portion 222 at an end connected to a valve body of the air intake valve 20 is greater than a width of the root portion 222 at an end connected to the valve plate 22. When the root portions 222 deforms, the ends of the root portions that are connected to the valve body of the air intake valve 20 undergo the greatest stress. By means of the design of the gradually varying width of the root portions 222, the ends of the root portions 222 that are connected to the valve body of the air intake valve 20 can withstand a greater stress, such that the robustness of the root portions 222 in the air intake state is ensured, and the root portions 222 are prevented from breaking.

In some embodiments, the two ends of the valve plate 22 are symmetrical about a center of the valve plate 22. The entire valve plate 22 can be formed as a symmetrical structure, so that when the valve plate 22 deforms in the air intake state, the root portions 222 located at the two ends are uniformly stressed, thus avoiding a breakage.

In some embodiments, the valve seat plate 30 is provided with a plurality of groups of air intake holes 33 (for example, the valve seat plate 30 may be provided with two groups of air intake holes 33). The air intake valve 20 is provided with a plurality of valve plates 22 (for example, the air intake valve 20 may be provided with two valve plates 22), wherein the root portions 222 of two adjacent valve plates 22 are connected by means of a connecting bridge 226, and each connecting bridge 226 fits with an sidestep groove 14. In the air intake state, the connecting bridge 226 is bent toward a corresponding sidestep groove 14.

The root portions 222 of two adjacent valve plates 22 are connected by means of the connecting bridge 226, and are then connected to the valve body of the air intake valve 20, so that the structure of the valve plates 22 can be reinforced. Each connecting bridge 226 fits with one sidestep groove 14, and the sidestep groove 14 supports and limits the bending deformation of the connecting bridge 226, so that the robustness of the connecting bridge 226 is enhanced.

Further, an existing crankcase air intake structure is generally provided with a group of air intake holes, resulting in a larger suction pressure, which is likely to cause the wear and breakage of the air intake valve plate and cause noise. In this embodiment, by means of the design of the plurality of groups of air intake holes 33 in combination with the plurality of valve plates 22, the suction pressure on each valve plate 22 can be reduced, the suction noise can be reduced, the suction efficiency can be improved, and the reliability of the crankcase air valve structure can be improved.

In some embodiments, the plurality of groups of air intake holes 33 are symmetrical about the center of the gas channel 12. In this way, the air intake is uniform throughout the gas channel 12.

In some embodiments, each group of air intake holes 33 includes a plurality of circular holes, wherein some adjacent circular holes of the circular holes are in communication with each other. For example, referring to a group of air intake holes 33 located on a left side as shown in FIG. 2, the group of air intake holes includes one circular air intake hole 33a and two peanut-shaped air intake holes 33b, and each peanut-shaped air intake hole 33b is formed by two circular air intake holes 33a in communication with each other. Some adjacent circular holes (not all) are in communication with each other, so that on the one hand, the suction area and the air intake amount are increased, and the suction efficiency is improved; and on the other hand, the noise caused by an excessively large air intake channel is avoided, and the air flow stability is ensured.

In some embodiments, each group of air intake holes 33 is symmetrical about the circular hole located in the center. In this way, the two ends of each valve plate 22 undergo a uniform gas pressure, ensuring the robustness of the valve plate 22.

In some embodiments, at least one air intake cavity 330 is provided on a side of the valve seat plate 30 facing away from the air intake valve 20, and each air intake cavity 330 is in communication with a group of air intake holes 33. By means of the air intake cavity 330, the connection of the valve seat plate 30 to other components is facilitated, and a sealed and stable air intake channel is formed.

In some embodiments, the valve seat plate 30 is further provided with an exhaust hole 36, and the air intake valve 20 is further provided with a hollowed-out portion 26 corresponding to the position of the exhaust hole 36. In this way, the exhaust from the crankcase is achieved. An exhaust cavity 360 in communication with the exhaust hole 36 is further provided on the side of the valve seat plate 30 facing away from the air intake valve 20. By means of the exhaust cavity 360, the connection of the valve seat plate 30 to other components is facilitated, and an exhaust channel is formed.

An embodiment of the present invention further provides an air compressor, and the air compressor is configured with a crankcase air valve structure as described in any one of the foregoing embodiments. The air compressor may be used in a commercial vehicle or other suitable products. The air compressor achieves steady air intake control by means of the crankcase air valve structure configured therefor, and has reduced air intake noise and higher air intake efficiency and reliability.

In summary, according to the crankcase air valve structure and the air compressor provided by the present invention, the valve plate 22 has a robust structure by virtue of the root portions 222 of the valve plate 22 located at the two ends; the root portions 222 located at the two ends are both stressed in the air intake state to avoid a breakage, the root portions 222 fit with the sidestep grooves 14, and the sidestep grooves 14 not only make a space for the deformation of the root portions 222, but also limit the maximum deformation of the root portions 222, thereby further ensuring the robustness of the root portions 222. Further, the lug portions 224 of the valve plate 22 fit with the accommodating recesses 15, and the accommodating recesses 15 accommodate and support the lug portions 224 in the air intake process, such that the lug portions 224 abut against the accommodating recesses 15 to avoid wear.

In this way, the crankcase air valve structure and the air compressor provided by the present invention can achieve steady air intake control and improve the reliability of the crankcase air valve structure and the air compressor.

The crankcase air valve structure and the air compressor provided by the present invention can also reduce the air suction pressure on each valve plate 22, reduce the suction noise, improve the suction efficiency and the reliability of the crankcase air valve structure and the air compressor by means of the plurality of groups of air intake holes 33 in combination with the plurality of valve plates 22.

The foregoings are further detailed descriptions of the present invention made with reference to specific preferred implementations, and it cannot be considered that the specific implementations of the present invention are limited to these descriptions. For those of ordinary skill in the art of the present invention, several simple deductions or substitutions can also be made without departing from the concept of the present invention, and should be regarded as falling within the scope of protection of the present invention.

The invention claimed is:

1. A crankcase air valve structure, comprising an air intake valve and a valve seat plate which are sequentially mounted on an end surface of a crankcase, wherein the valve seat plate is provided with at least one group of air intake holes;

the air intake valve is provided with at least one valve plate, each of the at least one valve plate having root portions located at two ends thereof and lug portions located between the two ends, and each of the at least one valve plate being connected to a valve body of the air intake valve via the root portions;

wherein the crankcase air valve structure further comprises sidestep grooves and accommodating recesses which are in communication with a gas channel of the crankcase are provided in the end surface of the crankcase;

wherein, in a non-air intake state, each of the at least one valve plate covers a corresponding group of air intake holes; and wherein, in an air intake state, the lug portions abut against corresponding accommodating recesses, and the root portions are bent toward corresponding sidestep grooves.

2. The crankcase air valve structure of claim 1, wherein a width of the root portion at an end connected to the valve body is greater than a width of the root portion at an end connected to the valve plate.

3. The crankcase air valve structure of claim 1, wherein two ends of the valve plate are symmetrical about a center of the valve plate.

4. The crankcase air valve structure of claim 1, wherein each group of air intake holes comprises a plurality of circular holes, wherein some adjacent circular holes of the circular holes are in communication with each other.

5. The crankcase air valve structure of claim 1, wherein the valve seat plate is further provided with an exhaust hole, and the air intake valve is further provided with a hollowed-out portion corresponding to the position of the exhaust hole.

6. An air compressor, wherein the air compressor is configured with a crankcase air valve structure of claim 1.

7. The crankcase air valve structure of claim 1, wherein a bottom wall of each of the accommodating recesses is inclined such that a depth of the accommodating recess gradually increases from a middle portion of the accommodating recess to an edge portion of the accommodating recess close to the sidestep groove.

8. The crankcase air valve structure of claim 7, wherein the depth of the accommodating recess at the edge portion is greater than a thickness of the lug portions.

9. The crankcase air valve structure of claim 1, wherein a bottom wall of each of the sidestep grooves is inclined such that a depth of the sidestep groove gradually increases from a middle portion of the sidestep groove to an edge portion of the sidestep groove close to the accommodating recess.

10. The crankcase air valve structure of claim 9, wherein a slope of the bottom wall of the sidestep groove is determined according to a maximum curvature of the root portion.

11. The crankcase air valve structure of claim 1, wherein the valve seat plate is provided with a plurality of groups of air intake holes;

the air intake valve is provided with a plurality of valve plates, wherein root portions of two adjacent valve plates are connected by means of a connecting bridge, and each connecting bridge fits with an sidestep groove; and in the air intake state, the connecting bridge is bent toward a corresponding sidestep groove.

12. The crankcase air valve structure of claim 11, wherein the plurality of groups of air intake holes are symmetrical about a center of the gas channel.

* * * * *